March 19, 1963 A. C. HALLER 3,082,097
PROCESS FOR PRESERVING PERISHABLE PRODUCTS BY REFRIGERATION
Filed July 25, 1960
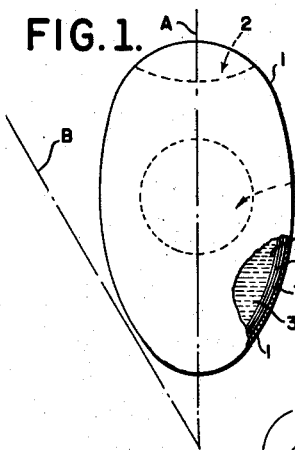
FIG. 1.
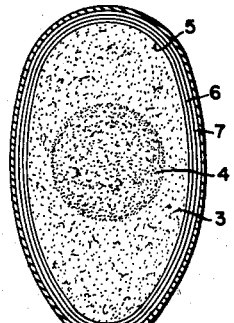
FIG. 2.
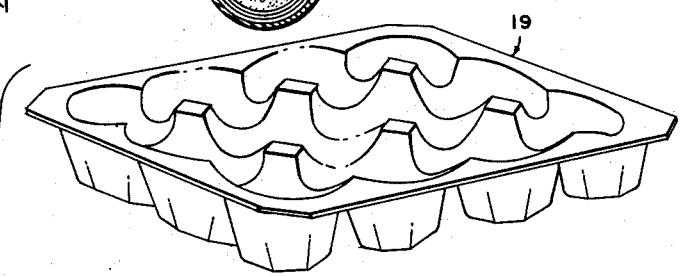
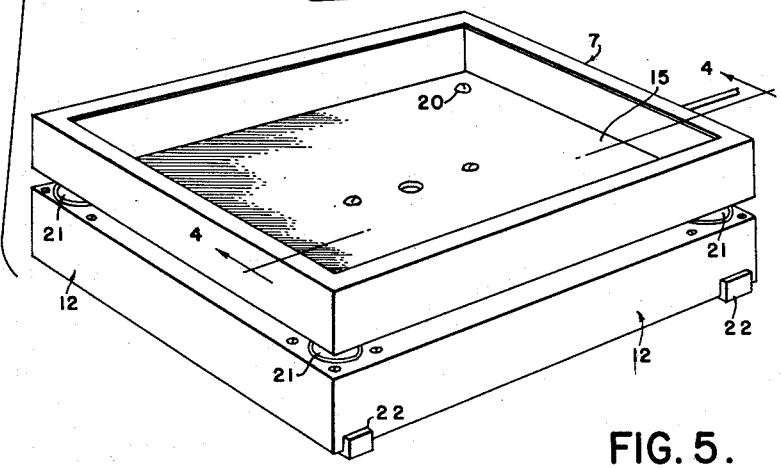
FIG. 3.
FIG. 4.
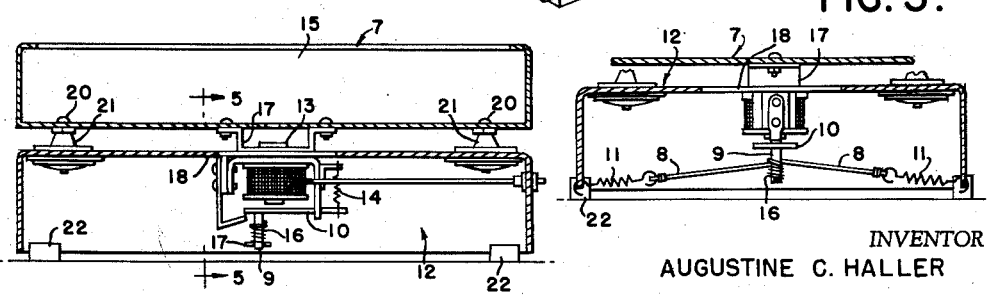
FIG. 5.
INVENTOR
AUGUSTINE C. HALLER
BY Garvey & Garvey
ATTORNEYS

United States Patent Office 3,082,097
Patented Mar. 19, 1963

3,082,097
PROCESS FOR PRESERVING PERISHABLE PRODUCTS BY REFRIGERATION
Augustine Charles Haller, Tabb, Va., assignor of one-half to Allen C. Blakely and Phyllis T. Blakely, both of Arlington, Va.
Filed July 25, 1960, Ser. No. 44,909
4 Claims. (Cl. 99—192)

This invention is an improvement on Patent No. 2,912,335 and relates to preserving foods and similar perishable products by freezing while the product is being mechanically vibrated at a low sonic frequency.

As set forth in the prior Haller patent, it was found that eggs vibrated mechanically at about 120 vibration cycles per second in a freezing medium could be frozen, frequently but not certainly, without breaking of the egg shell. It has been now found that other perishable cellular products, even such as have no rigid confining container, as an eggshell, can be frozen under similar conditions. Moreover, for the first time foods and similar perishables, some of which were not successfully frozen by known methods because the freezing tended to burst the cells and destroy, damage or impair the quality of the product upon thawing, may now be frozen by this method without the usual damage to the natural cellular structure. The freezing while vibrating tends to cause the ice crystals formed to be extremely fine, tending thereby to give the frozen product a creamy appearance, and it is believed that it is because of this fine ice crystal structure that the cellular structure comprising the product naturally expands in the freezing without actual bursting.

It has further been found that the process of the Haller patent is further improved in freezing such products, and particularly, even in the freezing of eggs, by applying the freezing procedure to the egg by rotating the product while it has been vibrated; or conversely to mount the product in the vibrator at any angle to its axis whereby some rotation can result naturally as the vibration continues.

Whole milk and cream frozen by this process similarly acquires the same creamy texture whereby they may be both consumed directly as a frozen product, like ice cream or sherbets, either in the natural dairy form or various containers, such as the typical cardboard containers or in a glass bottle, in which the entire product has been sealed in sterile or in pasteurized condition, and during the process, as described for the blood, the liquid product is converted to the solid creamy form which has expanded into additional space produced for expansion in the container, without tending to bulge, crack or strain the container.

In the instance of meat products a cut of meat such as beef may be placed in packaged form and frozen by the vibrator method hereof. Here again, it is found that ice crystals formed in the frozen meat are of very fine microcrystalline texture indicating the frozen consistency of the meat to be distinct from ordinary frozen meat.

As is known, fresh tomatoes are not usually amenable to freezing and recovery for use as fresh tomatoes after thawing, since when frozen by ordinary procedures and thawing, the thawed tomato does not have the same firm consistency as would be available from a fresh tomato of marketable ripeness. Tomatoes frozen according to the procedure hereof wherein the frozen ice crystals are of creamy fineness, of the usual microcrystalline size, can be and when sliced are found to have the closely approximate texture of fresh tomatoes in substantial contrast to tomatoes which have been frozen by other methods.

Oranges frozen by this method also obtain the creamy micro-crystal consistency and when thawed are useful as normal oranges in that the cellular structure does not appear to be damaged in any way.

Strawberries frozen by this procedure also obtain the creamy micro-crystalline structure and, on thawing, are firm and edible, in substantial contrast to strawberries frozen by other procedures.

Fresh vegetables as ear corn, shelled peas and green beans were frozen to micro-crystal cream ice by the present procedure and found to be reconverted on thawing to an edible product similar in approximate respects to normal fresh products.

Even fresh plants such as roses and carnations retain their bloom and do not tend to shed either petals or leaves nor do they acquire brown or dark spots as common with other freezing procedures applied to such plants.

In the general operation of the present method, the product to be frozen preferably is mounted in a special container, usually the final package in which the product will be handled and sold after freezing, the product or the package containing it being so oriented that the product will be angular with respect to a normal axis of vibration, whereby there is less strain produced in the frozen product; that is, it will have a reduced tendency to crack or shatter in the frozen state, and such products as are very fragile and have a strong tendency to crack, such as eggs, are readily frozen without damage.

It appears with respect to certain products which have no brittle skin, that is, ones in which the skin is quite flexible as in strawberries, oranges and the like that these have little tendency to crack or shatter, and will expand as usual with freezing without generating internal stresses, are stabilized in the mounting in containers as they are vibrated at an angle to the normal vibrational axis.

The process applied to such products otherwise generally follows the procedure outlined in the Haller patent in which—

FIG. 1 represents a whole fresh egg prior to processing with a portion of the shell broken away;

FIG. 2 is a central vertical sectional view through a fresh egg subsequent to processing;

FIG. 3 is an exploded perspective view of a form of vibrator suitable for carrying out the instant process;

FIG. 4 is a vertical sectional view taken on the line 4—4 of FIG. 3; and

FIG. 5 is a vertical sectional view taken on the line 5—5 of FIG. 4.

Reference is now made to FIG. 1 representing an unbroken fresh egg having an outer shell 1, an air chamber 2 at the blunt end thereof, a liquid white portion 3 consisting chiefly of albumen, and a yolk 4 which contains nutrient proteins and lecithins. Between the outer shell 1 and the contents of the egg are three inner skins or membranes of varying thickness with the thickest 5 innermost, a slightly thinner one 6, and the outermost and thinnest 7. These membranes induce the osmotic action through ventricular action, by which an egg can take in oxygen laden moisture but cannot breathe it out. These membrances function in a similar manner to the ventricles of a human heart or check valve in a mechanical device, only microscopically. If the egg is not incubated or maintained under proper storage conditions, it decays.

The usual methods for preserving fresh eggs by freezing have certain disadvantages which, as described above, include preliminary processing prior to freezing and are not as economical in time and money as this novel process.

Haller discovered that if a fresh egg is vibrated at low audible frequencies while simultaneously being subjected to freezing temperatures or in an ambient freezing environment, the liquid white and yolk portions 3 and 4, respectively, are each transformed to a fine, creamy, crystalline condition in which the crystals formed from the liquid white portion 3 expand into the air chamber 2 without cracking the shell. The process inhibits osmosis and prevents natural decay, and of course inhibits the natural rate of metabolism of the egg.

The discovery of this unique process was made while testing a piece of vibrating equipment in a home refrigerator which was regulated for below freezing temperatures. The vibrating equipment was placed in operation inside the refrigerator cabinet in a below freezing environment and a half dozen fresh eggs in a conventional egg carton were inadvertently placed on the vibrating equipment. Another half dozen fresh eggs in a conventional egg carton were also in the refrigerator at the time of testing the vibrating equipment, but on a shelf in the refrigerator and not in contact with the vibrating equipment. After a considerable period of operation, the vibrating equipment in the freezing environment in the refrigerator was inspected. At that time it was noted that none of the half dozen fresh eggs on the vibrating equipment had a cracked shell, while each one of the half dozen fresh eggs set apart in the refrigerator, not in contact with the vibrating equipment, had cracked shells. Other food products in the refrigerator during the test had also frozen.

Further investigation, which included cutting the frozen eggs in half longitudinally with a fine tooth saw, revealed that the former liquid white and yolk portions, 3 and 4, respectively, had been transformed to a fine, creamy crystalline state and the crystals formed from the liquid white had expanded so that the air chamber 2 was occupied by crystals. The crystals formed from the liquid white portion 3 and the yolk portion 4 remained separated as shown in FIG. 2. This discovery was followed by the construction of a vibrator such as shown in FIGS. 3, 4 and 5, and further tests conducted to conclusively verify the results. It is to be understood that the vibrator equipment may take other structural forms and the vibrations may be produced by means other than the electromechanical vibrator shown generally at 7 in FIGS. 4 and 5. Such other sources may include purely mechanical type vibrators, electric motor driven mechanical vibrators involving ratchet and cam devices, sonic vibrators, purely electronic devices for producing vibrations, or electronic, electrical or mechanical vibrators which, while not directly in contact with the eggs being processed would be transmitted to the eggs to induce vibrations therein. Further, it is contemplated that means used for transporting fresh eggs such as refrigerated freight cars, trucks, ships, and aircraft could be built to include vibrating equipment so that the fresh eggs could be processed and frozen while in transit. Additionally, it is contemplated that commercial storage facilities and home refrigerators and freezers be equipped with vibrating equipment in the freezing chambers or spaces so that fresh eggs may be placed in these freezing environments and processed by simultaneously being vibrated which will eliminate first processing the fresh eggs and then placing them in the freezing storage spaces.

The tests conducted using a vibrator similar to the one shown in FIGS. 3, 4 and 5, conclusively proved that whole fresh eggs if vibrated at low frequencies while simultaneously subjected to freezing temperatures or in a freezing environment, could be frozen without any cracking of the shell 1. The structure of the particular electromechanical vibrating device shown generally at 7 provided a frequency of vibration of 120 cycles per second when operated from a 60 cycle alternating current source. The doubling in frequency of vibration is accomplished by attaching a wire 8 to post 9 which is secured to the armature 10, and maintaining a tension in the wire 8 by connecting the free ends of the wire 8 to springs 11 which are in turn secured to the sides of the base portion 12 of the vibrator structure. A restraining member, which may be a coil spring 16 and locking member 17, serves to prevent the wire 8 from slipping off the post 9 and maintaining tension. Due to the structure of the electromagnet and the materials of the magnet core 13 and the armature 10, the armature 10 would be attracted to the core 13 on each alternation or half cycle of the source of electrical energy which would result in the armature 10 remaining attracted to the core 13 and no vibrations would result. On each half cycle, the flux in the core reverses and the material of the armature 10 is such that the magnetic retentivity of residual magnetism is very small which results in the armature 10 being held by the core 13 on each half cycle. To overcome this, the arrangement of the wire 8 and springs 11, which is a well-known expedient, was resorted to. The effect is that the springs 11 and wire 8 act as an additional spring load on the armature 10 in addition to the opposing force on the armature 10 exerted by the spring 14, which causes the armature 10 to oppose the attractive force of the flux in the core 13 during each half cycle and causes the armature 10 to vibrate 120 times per second when the alternating source is 60 cycles per second. It is possible to employ vibrators which, without benefit of the wire 8 and springs 11, will produce 120 cycle vibrations. For example, the strength or force exerted by the spring 14 may be chosen so that the armature 10 will oppose the attractive force produced by the magnetic flux in the core 13 during each half cycle, permitting movement of the armature 10 during each half cycle or 120 times per second. Alternatively, a permanent magnet may be used in conjunction with the electromagnetic circuit to attract the armature 10 during each cycle also resulting in 60 cycle vibrations. Such expedients are well known in the electromagnetic art and form no part of the instant invention other than to describe one form of apparatus which may be used to carry out this novel process. The actual tests conducted, to confirm the discovery, used the 60 cycle alternating current because of convenience, and the electromagnet was so constructed to produce 120 cycles per second. It is presumed that the fine crystals obtained are due to the vibration of the eggs while being frozen. Ordinarily, freezing without vibration will produce large crystals and it is presumed that such large crystals cause cracking of the shell of a fresh egg when subjected to a freezing process. It is therefore considered that a wide range of frequencies may be used. It is known however, that 120 cycles per second produces desirable results.

The particular form of vibrator illustrated in FIGS. 3, 4 and 5, in addition to the base portion 12 and vibrator shown generally at 7, includes a receptacle or tray portion 15 to which the vibrator is secured through a bracket 17. The base portion 12 has an opening 18 sufficiently large so that the vibrator 7 will not contact the base portion 12. The vibrations produced by the vibrator 7 are thus transmitted to the tray 15. An insert 19 in the form of a conventional type egg carton is used to support the eggs and keep them separated while being vibrated in a freezing environment. The tray 15 is mounted in registering position above the base portion 12 for free movement by bolts 20 passing through the bottom of the tray 15 adjacent the four corners thereof. The bolts 20 pass through resilient grommets 21 mounted on the base portion 12. The tray 15 is therefore free to move or vibrate when the vibrator 7 is energized from the 60 cycle source. The base portion 12 is provided with resilient members 22 clamped over the edges which serve as shock mounts.

To practice the process of the instant invention, fresh whole unbroken eggs are placed in the separate compartments of the insert 19, situated in tray 15. The vibrator 7 is energized from a 60 cycle alternating current source to cause the tray 15 to vibrate, and the entire vibrator assembly as shown in FIG. 3 is placed in a freezing environment where the eggs are simultaneously subjected to vibration of 120 cycles per second and freezing temperatures. In tests conducted to verify the discovery, a refrigerator was used and the temperature control set for about —10° F. The eggs were kept in this environment while being simultaneously vibrated for a period of about two hours. At the end of this time, the eggs were in a frozen condition but usually did not have cracked shells. The frozen eggs were stored without vibration overnight in a temperature of +10° F. and upon inspection it was noted that the shells had not cracked. Eggs so frozen and sawed open longitudinally showed that the white portion and yolk portion had been changed from a liquid state to a fine, creamy crystalline state, with the white portion and yolk portion completely separated and the air chamber 2 filled with crystals formed from the white liquid portion.

Occasionally however, it was found that eggs placed in container 19 substantially vertically would crack during the freezing process in a fixed pattern. That is, each egg whose axis was supported vertically in the container 19, vertical to the axis of vibration, would tend to crack, each in the same pattern. We have found the eggs which did not crack were those which were mounted at an angle to the vertical. For instance, referring to FIG. 1, the line A—A marks a vertical axis and A—B is a line at any angle to the vertical. When the egg is mounted at such angle, during vibration, it continually rotates about its axis A—B, and such angularly mounted eggs do not crack.

Moreover, we have found for eggs and other food products mentioned above that the vibrational frequency can be reduced somewhat, such as, as low as 60 cycles per second, in which case the crystalline structure is slightly coarser, particularly when frozen more rapidly such as at a room temperature below —20° F. The foods can also be frozen at a substantially higher frequency such as up to about 5000 cycles per second, but preferably less, in a range between these stated limits, depending upon the food product and the temperature at which it is frozen. Thus, while the Haller patent prefers a freezing temperature of —10° F. for eggs vibrated for about two hours at 120 cycles per second, we have found with various foods, that substantially lower temperatures can be used, less than —20° F., with lower or higher frequencies and consequent variation in the period of time needed to freeze the product and the fineness of the ice crystals formed. That time period for various products can vary quite widely with different products, depending upon the bulk thereof that needs freezing, its heat transfer characteristics and of course, the temperature differential to which it is subjected.

Eggs frozen by this process were used over a period of three months. After thawing, the eggs so processed were cooked, and no change in quality or taste was noticeable as compared to an unfrozen fresh egg. Since the whites and yolks do not intermix in the process, the eggs frozen by this process may be used and prepared in the same manner as fresh unfrozen eggs.

The actual tests of the process were conducted at —10° F. and for two hours. It was noted while testing the process that when fresh, whole, unbroken eggs were placed in a beaker covered with a Pliofilm top and vibrated in a freezing environment of about —5° F., the time required to freeze the eggs was so long as to be impractical. However, when the temperature of the environment was dropped to about —10° F., rapid freezing of the eggs in the covered beaker took place. Additional tests were conducted using fresh, whole, unbroken eggs which were vibrated in a frezing environment of about —10° F. In these latter tests the vibrated, unbroken eggs were successfully frozen in a period of approximately two hours and were then successfully stored at +10° F.

The following examples further illustrate the practice of this invention:

*Example 1*

Eggs were divided into two batches of one dozen each and the first batch had the axis of the egg mounted vertically to the direction of the application of the vibrational energy in container 19; that is, the egg is mounted vertically with its axis the same as the line A—A of FIG. 1. In the second batch the eggs were mounted in an angle to that axis, about 60° plus or minus 15°, the specific angle other than vertical being measured only approximately. Both batches of eggs were vibrated at 120 cycles per second at a temperature of —10° F. for 2 hours. It was found at the end of the period that all of the eggs were frozen. In the first vertically mounted batch, however, four of the eggs were cracked, all in the same pattern. In the second angularly mounted batch, none of the eggs were cracked. It is believed that this example tends to show that there are greater directional stresses upon the egg shell when frozen, mounted with their axes vertical whereby the vibrational energy continuously permeates the egg in the same direction. This, it is believed, is because the egg, mounted vertically, does not tend to rotate with the vibrations to continuously redistribute the direction of stresses therethrough. Eggs mounted at an angle, however, rotate continuously so that, it is believed, the vibrational energy direction through the egg is continuously changing. It appears that the vertical mounting subjects the eggs to greater stresses, such that many of the eggs will crack. When they are mounted at an angle, that is other than vertical, the stresses do not accumulate or in any case are less, and therefore there is less tendency to crack. All of the egg had the same fine creamy crystalline appearance as the egg of the Haller patent.

*Example 2*

Whole, 90% red and almost ripe strawberries, firm in texture, were placed in a cardboard container and firmly packed to prevent the attrition by movement between the container and between the berries, were vibrated at 200 cycles per second for a period of 90 minutes at a temperature of —25° F. They are found to be frozen hard throughout, but with a creamy texture indicating that ice crystals are a very fine size. The interior of the strawberries appeared to the eye to be homogeneous. On thawing they appeared to be of as good a quality as fresh, indistinguishable from the fresh strawberries. Moreover, they did not appear after 24 hours to have further ripened significantly.

*Example 3*

Tomatoes of firm texture sufficiently ripened to be about ¾ red with a trace of green on the top were frozen whole by being mounted in a container similar to that of container 19 except that the cup-like receptacle space for each tomato was larger to firmly encase the tomato, the tomatoes however, being firmly held so that no rotation was possible. They were vibrated for a period of about two hours at 120 cycles per second at a temperature of about —10° F. They were found to be homogeneously frozen. None of them had burst in the process.

Those which had been mounted with the axis vertical retained their normal shape whereas those that had been mounted at an angle to the vertical axis; that is, the same as the line A—B illustrated in FIG. 1 were slightly distorted. It appears that the tomato will not burst because the shell is sufficiently flexible to accommodate the expansion by freezing. However, the tomato should be mounted at an angle to the axis of vibration in a container that is free to rotate if symmetry is to be preserved; or alternatively with their axes vertical to the direction of vibration. The texture of the tomatoes were smooth and creamy and upon thawing, no discernible difference was present with respect to a tomato which had not been frozen. They had not ripened significantly in the frozen state.

*Example 4*

Whole milk in its original paper carton, having room for expansion of the frozen product into the "hipped roof" top was vibrated for a period of three hours at a frequency of 120 cycles per second at a temperature of about −10° F. and was found to be of fine creamy crystalline condition as the frozen egg of Example 1.

Another example of whole milk which had been pasteurized but not homogenized was filled into the same kind of paper carton and vibrated at a frequency of 1000 cycles per second at −10° F. for a period of two hours. The fine creamy structure was at least as smooth as before. However, on standing, after thawing, it was found that no cream layer separated. The milk was found to be more homogeneous. This indicates that substantial homogenization takes place in the carton.

*Example 5*

Whole oranges were vibrated like the tomatoes of Example 3, mounted in a container which firmly held the fruit while it was vibrated for 1½ hours at a temperature of −20° F. at 240 cycles per second. The fruit was slightly distorted in shape, but not noticeably so without close study. It was found upon slicing to be of creamy texture with very micro-fine crystals of ice. None of the orange cells appeared to be broken or damaged. Upon thawing the orange appeared to be quite normal with respect to similar oranges which had not been frozen.

*Example 6*

Cut ear corn, the kernels of which had been stripped from the cob, were filled in cylindrical paper cartons with sufficient space in each to accommodate the expansion of the corn by freezing and mounted in a container similar to that of 19, at an angle to the axis of vibration so that the cylindrical containers were free to rotate by the vibration and frozen while being vibrated at 300 cycles per second for a period of two hours at a temperature of about −10° F. The carton had not bulged or expanded and the corn was found to be of fine creamy crystalline consistency as previously described for other produce.

*Example 7*

Shelled peas were packaged and frozen as described in Example 6, except that the freezing temperature was −20° F. and the vibrational frequency was 150 cycles per second and the product was frozen in about two hours. The frozen peas had a similar creamy crystalline structure and upon thawing were of good edible consistency and color.

*Example 8*

Green beans were processed as described in Example 6 with the modification that the frequency was 500 cycles per second applied at a temperature of −30° F. and for a period of 1½ hours and the product appeared to have the same frozen creamy crystalline formation and beneficial properties as described for other products treated by this process.

*Example 9*

Long stemmed carnations were mounted in a flat box and firmly retained by light tissue paper to prevent attrition between parts and vibrated at frequency of 120 cycles per second for two hours at −10° F. No damage appeared along the entire flower or stem and no evidence of soft or dark spots appeared in the petals or stem. On thawing, the blooms appeared to be as perfect as the original.

*Example 10*

Fresh cut meat is packaged according to known procedures either in a closely adherent film wrapper or in a cardboard carton in which only the one observable surface is enclosed by a plastic film. Hamburger patties in a thus-enclosed cardboard carton with an extra observation window of plastic film were secured to a vibrating device 19 as in FIG. 1, and vibrated for a period of 3 hours at a temperature of −10° F. and a frequency of 120 cycles per second. The product was found to be hard frozen and the fine crystalline structure described above was present. This may be the reason the frozen meat had a fresh red meat appearance. It did not look frozen.

In a modification of this example, a sirloin steak which had been coated by dipping in hot molten ethyl cellulose, as described in U.S. Patent 2,811,453, was vibrated at −20° F. at a frequency of about 300 cycles per second for a period of 1½ hours and found to be frozen throughout. Quite similar to that of the hamburger, no ice film or large ice crystals appeared and the product did not appear to be frozen. It was bright fresh red meat, except for its very hard body.

Various other meat products such as dressed poultry or sausage as well as fish, including shellfish, oysters, shrimp, lobster and dressed fish fillets and other fruits including fruit juices as well as various berries, pears, apples, bananas and other vegetable products such as potatoes and other green leafy vegetables can be frozen by the present method to produce therein a hard frozen product of very fine creamy crystalline structure which upon thawing returns the product substantially to its pre-frozen condition, the freezing appearing to substantially retard enzymatic ripening processes.

Although it has been found from actual tests that optimum results are obtained when the vibrational energy of a frequency exceeding about 60 to 120 cycles per second is applied to the products, nevertheless it is possible that the cycles may vary to a range of from 10 to 5,000 cycles per second, depending upon the characteristics of the products.

It is accordingly intended that the examples and description hereof be regarded as illustrative and not limiting, except as defined in the claims appended hereto.

What is claimed is:

1. The method of preserving substantially symmetrical solid perishable products by refrigeration comprising vibrating the products at subfreezing temperatures at a frequency of about 60 to 5,000 cycles per second for a period sufficient to freeze the same, the products being inflexible symmetrical units and being mounted at an angle other than normal to the plane of vibration and thereafter storing the frozen products in a freezing environment.

2. The method as defined in claim 1 wherein the perishable products are fresh whole eggs which are vibrated while being supported in spaced relation, the eggs being mounted with their longitudinal axes each at a substantial angle other than normal to the plane of vibration, while subjecting the eggs to a temperature of approximately −10° F. for approximately two hours and thereafter storing the eggs in a freezing environment.

3. A substantially symmetrical perishable product preserved by freezing, said frozen product being selected from the group consisting of fresh fruits, vegetables, cut plants, and the like, said product being characterized by having its cellular structure undamaged in the freezing and having its aqueous liquid content frozen to a creamy consistency including ice crystals of micro-crystalline size by freezing while vibrating in the range of about 60 to 5,000 cycles per second.

4. The method as defined in claim 1 wherein the perishable products are mounted in a manner to allow rotation about their axes of symmetry while being vibrated and frozen.

References Cited in the file of this patent

UNITED STATES PATENTS

| | | |
|---|---|---|
| 2,000,021 | Hoffman et al. | May 7, 1935 |
| 2,028,806 | Rechtin | Jan. 28, 1936 |
| 2,912,335 | Haller | Nov. 10, 1959 |

FOREIGN PATENTS

| | | |
|---|---|---|
| 798,863 | Great Britain | July 30, 1958 |